United States Patent

[11] 3,568,175

| [72] | Inventors | Richard A. Schwehr<br>South Euclid;<br>Marc A. Pohm, Lorain, Ohio |
|---|---|---|
| [21] | Appl. No. | 713,113 |
| [22] | Filed | Mar. 14, 1968 |
| [45] | Patented | Mar. 2, 1971 |
| [73] | Assignee | Towmotor Corporation<br>Cleveland, Ohio |

[54] PROTECTIVE MONITORING CIRCUIT FOR A VEHICLE BATTERY
2 Claims, 2 Drawing Figs.

[52] U.S. Cl. ........................................... 340/249, 320/48
[51] Int. Cl. ........................................... G08b 21/00; H02j 7/00
[50] Field of Search ........................................... 340/52, 56, 421, 419, 222, 223, 248, 249, 250, 251, 252, 253, 256; 320/31, 33, 48, 49; 307/9, 10.

[56] References Cited
UNITED STATES PATENTS

| 3,118,137 | 1/1964 | Vincent | 340/249 |
| 3,243,658 | 3/1966 | Blackburn | 340/248B |
| 3,349,386 | 10/1967 | Zug | 340/249 |
| 3,373,316 | 3/1968 | Palmer | 340/248 |
| 3,389,325 | 6/1968 | Gilbert | 320/31 |
| 3,447,060 | 5/1969 | Tedd | 340/249X |
| 3,475,061 | 10/1969 | Steinkamp et al. | 320/48X |

*Primary Examiner*—John W. Caldwell
*Assistant Examiner*—Daniel Myer
*Attorney*—Fryer, Tjensvold, Feix, Phillips and Lempio

ABSTRACT: A solid-state circuit provides a visual indication when the battery of an industrial truck is approaching a discharged condition and if the condition is not corrected within a predetermined time the circuit automatically inactivates one or more electrical components thereby protecting the battery and forcing the operator to take remedial action. The circuit discriminates against brief voltage drops which do not necessarily indicate a discharged battery.

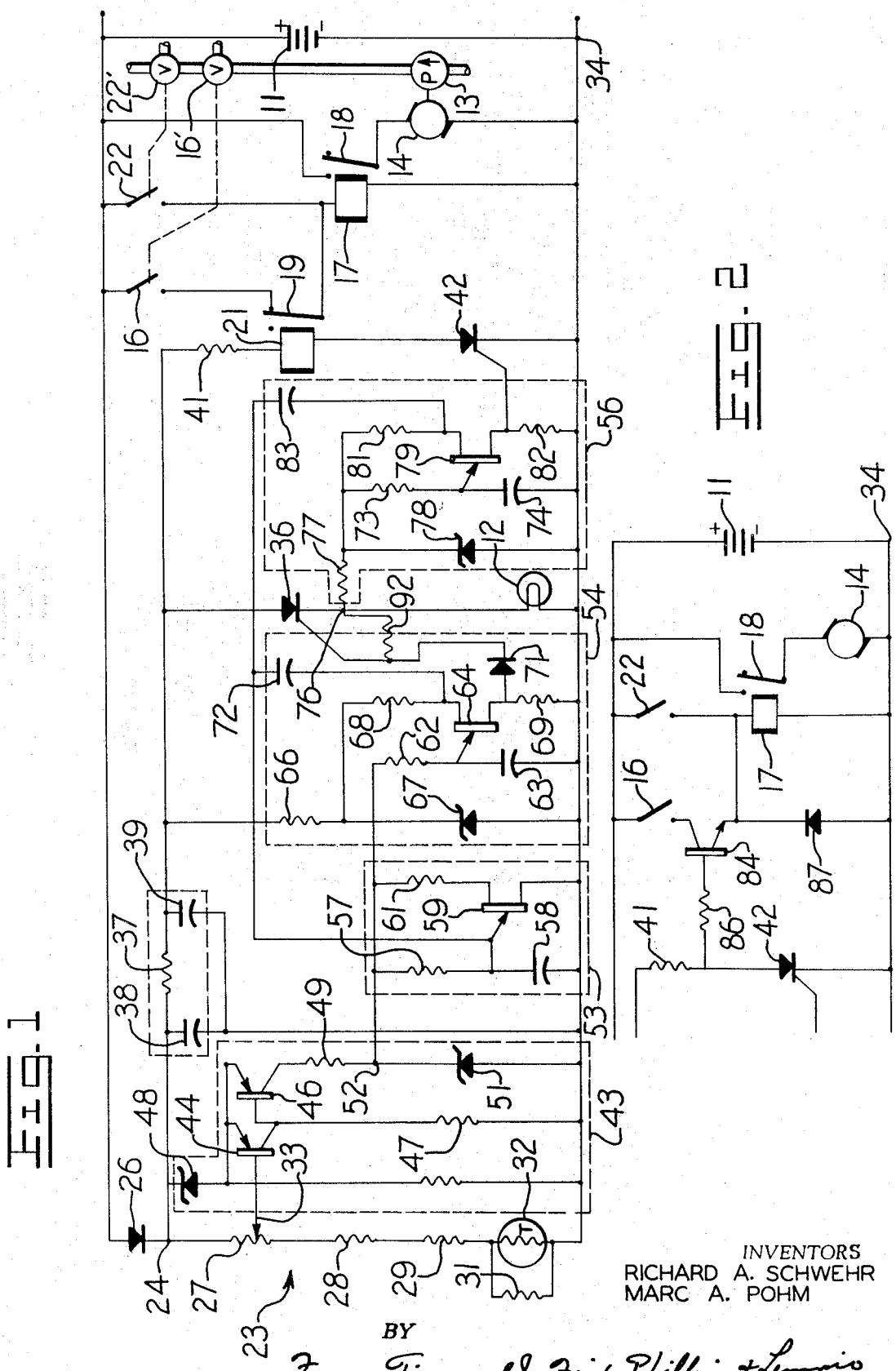

PROTECTIVE MONITORING CIRCUIT FOR A VEHICLE BATTERY

BACKGROUND OF THE INVENTION

This invention relates to circuitry for monitoring the charge condition of a vehicle battery and more particularly to a circuit which reliably indicates an approaching discharged condition and protects the battery by enforcing prompt corrective action.

Vehicles of the class which are wholly or partly operated from batteries are generally equipped with some form of indicator for alerting the operator when the battery is approaching a discharged condition. These warning systems may have two primary purposes. A first purpose is to avoid an unexpected stoppage of the vehicle, possibly at an inconvenient time and location, and the second purpose is to forestall operation of the vehicle with a near discharged battery. Operation of the vehicle under the latter condition is highly undesirable in that battery damage can result.

The battery monitoring systems which are presently employed are not wholly effective for either of these purposes. A first problem is that the conventional systems are purely warning devices and therefore depend upon the operator's judgment and cooperation in promptly taking corrective steps. Several factors may cause the operator to delay recharging or changing of the battery after the warning light or other indicator has operated. The operator may, for example, be using the vehicle for some task which he does not wish to interrupt and may overestimate the time available for such purpose without battery damage. Some operators may not fully understand the seriousness of operating the vehicle with a discharged battery or may be careless about the matter. Still another adverse factor in conventional warning systems is that the lamp or other indicator may be activated momentarily at times when the battery is not near a discharged condition and the operator's knowledge of this may cause him to tend to ignore the warning system. Many conventional indicators, for example, flash on during the momentary battery voltage drops which are normal even with a fully charged battery. The starting of an electrical motor on the vehicle momentarily draws an abnormally heavy current from the battery with a corresponding drop in battery voltage. Where motor operated components are repeatedly activated and deactivated during use of the vehicle, the battery warning lamp may flash on and off repeatedly. The operator must learn to ignore these momentary warnings until such time as the frequency and durations of the activation of the indicator increase to a point indicative of a near discharged battery. This obviously calls for a careful and trained judgment on the part of the operator.

Thus a characteristic of the conventional battery monitoring system is that avoidance of unexpected electrical malfunctions and avoidance of battery damage is very much dependent upon careful attention and good judgment on the part of the operator. Because of this factor, the reliability of the conventional system is considerably less than would be desirable.

SUMMARY OF THE INVENTION

The present invention is a battery monitoring system which reliably indicates when the battery is approaching a discharged condition and which also takes protective actions which tend to force the operator to correct the condition. In particular, the invention lights a lamp or activates some other form of indicator when the battery is approaching a discharged state to signal the operator. Subsequently, if the battery is not recharged or replaced promptly, the system automatically deactivates one or more electrically operated components of the vehicle. The components which are deactivated, at least initially, are not usually those required to drive the vehicle so that the operator may still return to the charging station but is prevented from carrying out one or more of the other electrically controlled functions of the vehicle. In a fork lift truck, for example, the system may inactivate the fork raising mechanism after a predetermined period while still allowing the truck to be driven to the recharging station.

As a practical matter, the knowledge that vehicle functions will be interrupted a predetermined time after the warning indicator has operated tends to motivate even an inexperienced operator to be alert to the indicator and to take prompt corrective measures. Thus an actual interruption of vehicle functions is not a common occurrence in practice. In effect the system partially transfers the judgment about when to recharge the batteries from the operator to the monitoring circuit itself.

The invention contributes still further to reliable operation by discriminating against momentary voltage drops which do not necessarily indicate a discharged battery whereby the operator can place greater reliance in the warning indicator. Further, the circuit inherently protects against prolonged overload abuse.

Accordingly it is an object of this invention to provide a more effective vehicle battery monitoring system.

The invention, together with further objects and advantages thereof, will best be understood by reference to the following description of preferred embodiments in conjunction with the accompanying drawing.

BRIEF DESCRIPTION OF THE DRAWING

In the accompanying drawing:

FIG. 1 is a circuit diagram of a battery monitoring system for an industrial truck in accordance with the invention; and FIG. 2 illustrates a modification of a portion of the circuit of FIG. 1.

DESCRIPTION OF PREFERRED EMBODIMENTS

Referring now to FIG. 1 of the drawing, the invention was developed for use with an industrial truck of the fork lift type and accordingly will be described with reference thereto, it being understood that the invention is applicable to other types of vehicles having one or more batteries and battery operated components.

An industrial truck of this kind has a rechargeable storage battery 11 which may operate several working components of the vehicle variously including the vehicle drive motor itself, the fork lift and tilt controls and certain other standard accessories. The circuit of FIG. 1 is designed to monitor the terminal voltage of battery 11 and to light a warning lamp 12 when this voltage reaches a sustained low level indicative of a near discharged condition. In accordance with an important aspect of the invention, the circuit inactivates one or more of the electrically operated components of the truck if the battery voltage is not restored to a safe level within a predetermined interval after the warning lamp operates. In most cases the inactivated component is not the vehicle drive motor as this would prevent the vehicle from being driven to the recharging station under its own power. In an industrial truck of the type discussed above, inactivation of the fork lifting mechanism is a desirable technique as this prevents the operator from continuing to work with the truck but does not immobilize the vehicle.

The fork lift mechanism of such a truck may typically be operated hydraulically by fluid supplied by a pump 13 which is in turn driven by an electrical motor 14 operated from the battery 11. The operator activates the lift by closing a normally open lift control switch 16 to energize a motor start relay coil 17 which in turn closes a normally open set of relay contacts 18 to connect the motor 14 across the battery 11. Lift control switch 16 energizes the motor start coil 17 for this purpose through a second set of relay contacts 19 which are normally closed and which are controlled by a lift interrupter relay coil 21.

Coil 21 is energized to open contacts 19 a predetermined time after the lamp 12 has been energized by the circuitry to be hereinafter described. Once the relay contacts 19 have been opened in this manner, the operator cannot activate the lift system in that the closing of the lift control switch 16 does not energize motor start coil 17.

It is not necessary that this system inactivate the motor 14 and fluid pump 13 for all purposes. Thus a separate, normally open operator's control switch 22 may provide for energizing of the motor start coil 17 independently of the lift control switch 16. This may provide for operation of fluid pump 13 for other purposes, such as for tilting of the forks for example at the time when the pump is inactivated insofar as raising of the forks is concerned. This is possible in that each control switch 16 and 22 is coupled to a separate fluid flow control valve 16' and 22' respectively which must be actuated in conjunction therewith. Suitable hydraulic circuitry for these purposes is known to the art and accordingly is not described in detail herein.

Considering now the circuitry which controls the lamp 12 and lift interrupter relay coil 21, a voltage divider 23 is connected across the battery with a terminal point 24 at one end of the voltage divider being coupled to the positive side of the battery through a diode 26 which blocks inverted voltages. Voltage divider 23 is comprised of a potentiometer resistance 27, connected to terminal point 24, in series with additional resistors 28, 29 and 31 with a thermistor 32 being connected in parallel with the final resistor 31 to provide temperature compensation. The setting of the adjustable contact 33 associated with the potentiometer resistance 27 determines the degree of decrease in battery voltage required to initiate operation of the warning lamp 12.

The warning lamp 12, or other electrically operated indicator such as a buzzer, bell or the like, is connected between the terminal point and a B− conductor 34 which is connected to the negative side of the battery, with an SCR (silicon controlled rectifier) 36 and filter resistor 37 being in series relationship between the lamp and terminal 24. SCR 36 controls the energization of the lamp 12 as will hereinafter be described. Separate capacitors 38 and 39 are connected between each end of filter resistor 37 and B− conductor 34 to aid in preventing triggering of the warning and protective operations of circuit by very brief voltage drops. Such transitory voltage drops may occur from various causes such as the starting of an electric motor and are not necessarily indicative of a discharged battery.

The lift interrupter relay coil 21 which functions to prevent operation of the lift mechanism of the truck in the event of a failure to recharge the battery following operation of the warning lamp 12 is connected between terminal point 24 and B− conductor 34 in series with a current limiting resistor 41, the previously described filter resistor 37 and an SCR 42. SCR 42 thus controls energization of the lift interrupter relay coil 21. A battery voltage sensing circuit 43 is comprised of a first transistor 44 having a base connected to the movable contact 33 of the potentiometer 27 which provides for adjustment of the degree of battery voltage loss required to trigger the circuit into operation. The collector of transistor 44 is connected directly to the base of a second transistor 46 and to B− conductor 34 through a resistor 47. The emitters of both transistors 44 and 46 are coupled to positive terminal point 24 through a Zener diode 48 and the collector of the second transistor 46 is connected to B− conductor 34 through a resistor 49 and an additional Zener diode 51.

Thus with an acceptably strong battery voltage level, the first transistor 44 is normally on as the emitter voltage is biased above that of the base by the above described circuitry. Accordingly, with an acceptably high battery voltage level, the second transistor 46 is turned off and no output signal is present at the collector thereof. As the battery voltage drops, the emitter voltage at first transistor 44 approaches the base voltage eventually turning the transistor off. This cuts off the current flow through resistor 47 reducing the voltage at the base of second transistor 46. Second transistor 46 is thereby turned on and produces an output signal current through resistor 49 and Zener diode 51. The output of the battery voltage sensing circuit 43, taken from a terminal point 52 between resistor 49 and Zener diode 51, activates a pulse circuit 53 and a short term (one minute) timing circuit 54. The one minute timer 54 functions to delay energization of the warning lamp 12 following an output signal from battery voltage sensing circuit 43 for a period sufficient to insure that the voltage drop is not a temporary occurrence due to a brief overload or other transitory cause. In the present example, this period if fixed at 1 minute although it will be apparent that different delay times can be provided in accordance with the characteristics of the vehicle with which the circuit is associated.

Pulser 53 functions to provide accurately timed negative pulses which are supplied to the 1-minute timer 54 and to a longterm (5-minute) timer 56 to provide for consistency in the delay times of the timers. For this purpose, pulser 53 may be comprised of a resistor 57 and a capacitor 58 connected in series between terminal point 52 and B− conductor 34. The emitter of a unijunction transistor 59 is connected to the positive side of capacitor 58 so that the transistor is fired at a rate, 40 Hz. in this instance, fixed by the time constant of resistor 57 and the capacitor. One base of unijunction transistor 59 is connected to terminal point 52 through a resistor 61 and the other base of the transistor is connected to B− conductor 34. Output pulses may be taken from the emitter as will hereinafter be described.

The 1-minute timer 54 is comprised of another resistor 62 and capacitor 63 connected in series between terminal point 52 and B− conductor 34 for controlling an additional unijunction transistor 64, the emitter of the transistor being connected to the positive side of capacitor 63. One base of the transistor is connected to positive voltage terminal point 24 through a pair of series resistors 66 and 68 and through filter resistor 37 with a Zener diode 67 being connected from the junction between resistors 66 and 68 to B− conductor 34 to provide for a constant voltage. The other base of transistor 64 is connected to B− conductor 34 through still another resistor 69 and to the gate of SCR 36 through a diode 71. Resistor 92 from terminal point 76 to the gate of SCR 36 ties the gate and cathode of SCR 36 together to prevent misoperation due to radio frequency interference and positive voltage spikes. Thus when an output signal current appears at terminal point 52 of the battery voltage sensing circuit 43 as hereinbefore described, the capacitor 63 of the 1-minute timer begins to charge through resistor 62 and after an interval determined by the time constant of the resistor capacitor combination, transistor 64 becomes conducting and transmits an output signal to the gate of SCR 36 through diode 71. This turns on the SCR 36 and lights the warning lamp 12. Greater precision in the time interval between the output signal from voltage sensing circuit 43 and the energization of lamp 12 is obtained by connecting the positive base of 1-minute timer unijunction transistor 64 with the emitter of the pulser unijunction transistor 59 through a coupling capacitor 72. Where the time constant of resistor 62 and capacitor 63 is large, as in this instance, the rapid series of pulses applied to transistor 64 from the pulser causes the transistor 64 to conduct at a consistent state of charge of capacitor 63. The circuit as described to this point operates to energize the warning lamp 12 following detection of an undesirably low battery voltage level and after waiting a brief interval to determine if the under voltage is a temporary drop not necessarily indicative of a discharged battery. In accordance with an important aspect of the invention, the circuit operates further to inactivate the lift system of the fork lift truck if the battery voltage is not restored to an acceptable level within a predetermined further period of time. The latter function is effected by the longterm (5-minute) timer 56 which operates to turn SCR 42 on after the predetermined further time period.

For this purpose the 5-minute timer 56 may be essentially similar to the 1-minute timer and may be comprised of a capacitor 74 having a negative side connected to B− conductor 34 and being charged by a connection to a terminal point 76 between SCR 36 and lamp 12 through series resistors 73 and 77. A Zener diode 78 is connected between B− conductor 34 and the junction between resistors 73 and 77 to maintain a constant input voltage. Thus as the lamp 12 is energized, capacitor 74 commences to charge with the voltage thereon rising in accordance with the time constant which in this example is selected to provide for firing of a unijunction transistor 79 after 5-minutes. For this purpose, the emitter of the transistor 79 is connected to the junction between resistor 73 and capacitor 74. The positive base of the unijunction transistor 79 is coupled to terminal point 76 through a resistor 81 and the previously described resistor 77 while the other base is coupled to B— conductor 34 through still another resistor 82 and to the gate of the previously described SCR 42.

Thus when the transistor 79 conducts following a time interval determined by the time constant of resistor 73 and capacitor 74, SCR 42 is turned on to energize lift interrupter relay driver coil 21. This opens relay contacts 19 so that the operator of the truck will thereafter be unable to operate the lift motor 14 by actuation of his control switch 16. To provide for consistency in the timing of the inactivation of the lift mechanism, the positive base of unijunction transistor 79 is coupled to the output of pulser 63 through a coupling capacitor 83.

When the discharged battery 11 is being recharged or replaced, the currents through SCR 36 and SCR 42 are interrupted and both components are therefore turned off. This deenergizes warning lamp 12 and relay coil 21 thereby restoring the circuit to the initial condition.

In practice, the operation of the circuit does not usually proceed to the point where 5-minute timer 56 energizes relay coil 21 to interrupt operation of the lift mechanism. The knowledge that this will occur within a known period of time after lamp 12 is energized, strongly motivates the operator of the truck to drive to the recharging station and take prompt steps to correct the undesirable battery condition.

Many variations in the above described circuitry are possible without departing from basic aspects of the invention. For example where it is desired to obtain the benefits of solid-state circuitry to a greater extent, the relay coil 21 and contacts 19 which interrupt the lift mechanism may be replaced with a transistor circuit. A suitable arrangement is illustrated in FIG. 2 wherein the battery 11, lift motor 14, relay contacts 18 and driver coil 17, and tilt control switch 22 are shown in an arrangement essentially similar to that previously described except that the relay driver coil 17 is controlled by a transistor 84 instead of an additional relay as in the first embodiment. Transistor 84 may have a base connected to the junction between the previously described resistor 41 and SCR 42 through an additional resistor 86. The collector of transistor 84 is connected to the positive side of the battery through the lift control switch 16 while the transistor emitter is connected to B— conductor 34 through a diode 87 which protects the transistor from transient voltage impulses. In this embodiment the SCR 42 is normally off when the battery voltage is sufficiently high as in the previously described embodiment. This maintains the transistor 84 in a conducting condition so that the operator may operate the lift relay 17 by actuation of his control switch 16 at such times. However when the SCR 42 is turned on, a predetermined interval after detection of a discharged battery in the manner previously described, the voltage at the base of transistor 84 drops and the transistor is turned off. Under this condition the operator cannot energize relay driver coil 17 by means of switch 16 and is therefore unable to operate the lift mechanism.

Thus while the invention has been described with reference to certain specific embodiments, it will be apparent that many modifications and variations are possible within the scope of the invention and it is not intended to limit the invention except as defined in the following claims.

I claim:

1. A protective monitor for a vehicle battery wherein the vehicle has an electrically actuated component additional to electrical components required for driving the vehicle comprising:

an indicator for warning the operator of said vehicle of an undesirably low battery voltage;
a voltage sensing means coupled to said battery;
a short term timer coupled between said voltage-sensing means and said indicator for activating said indicator after a first fixed-time interval has elapsed following a decrease of battery voltage to a predetermined level;
a long term timer coupled between said short term timer and said electrically actuated additional component of said vehicle and operative to deactivate said additional component of said vehicle after a second fixed-time interval has elapsed following activation of said indicator, said second time interval being greater than said first time interval, said components for driving said vehicle being unaffected by said operation of said longterm timer; and
a filter circuit having resistive and capacitive elements coupled to said voltage sensing means, said filter circuit resisting rapid voltage changes at said voltage sensing means whereby said voltage sensing means does not respond to transient voltage decreases.

2. A monitoring circuit for a vehicle battery wherein the vehicle has an electrically actuated component additional to electrical components required for driving the vehicle comprising:

an electrically operated indicator device connected across the terminals of said battery;
a first switching means connected in series with said indicator device and having a conductive and a nonconductive condition for controlling said indicator;
an electrically actuated control element for said additional component of said vehicle;
a second switching means connected in series with said vehicle component control element and having a conductive and a nonconductive condition;
a resistor connected across said battery terminals;
voltage sensing means connected across said battery terminals and having a conducting and a nonconducting condition as determined by the voltage applied to a control terminal thereof, said control terminal being coupled to said resistor whereby said voltage sensing means is switched from one condition to another when the voltage across said resistor drops to a predetermined level, said voltage sensing means having an output terminal;
a short term timing circuit having an input connected to said voltage sensing means output terminal for actuation by said change of condition thereof and having an output coupled to said first switching device for operating said switching device following a first predetermined period after switching of said voltage sensing means whereby said indicator is actuated after said first period;
a long term timing circuit actuated in response to actuation of said indicator and having an output coupled to said second switching device for operating said second switching device following a second predetermined time period after actuation of said indicator whereby said additional component of said vehicle is inactivated if the reduced battery voltage condition is not corrected within said second predetermined time period;
said long term timing circuit having a resistor and capacitor coupled to said indicator device whereby said capacitor commences to charge upon energization of said indicator, said resistor and capacitor having a time constant which determines said second predetermined time period, and having a unijunction transistor having a base terminal controlling said second switching device and having an emitter coupled to said capacitor whereby said transistor produces an output signal at said base terminal after said second predetermined time period; and
said monitoring circuit further comprising a pulser actuated by said voltage sensing means and having an output delivering a series of accurately timed electrical pulses, said output being coupled to said base of said unijunction transistor.